US011995115B2

(12) United States Patent
Abe et al.

(10) Patent No.: US 11,995,115 B2
(45) Date of Patent: May 28, 2024

(54) INFORMATION EXTRACTING DEVICE, INFORMATION EXTRACTING METHOD, AND INFORMATION EXTRACTING PROGRAM

(71) Applicant: NIPPON TELEGRAPH AND TELEPHONE CORPORATION, Tokyo (JP)

(72) Inventors: Naoto Abe, Tokyo (JP); Hitoshi Seshimo, Tokyo (JP); Hiroshi Konishi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 206 days.

(21) Appl. No.: 17/618,820

(22) PCT Filed: Jun. 14, 2019

(86) PCT No.: PCT/JP2019/023768
§ 371 (c)(1),
(2) Date: Dec. 13, 2021

(87) PCT Pub. No.: WO2020/250448
PCT Pub. Date: Dec. 17, 2020

(65) Prior Publication Data
US 2022/0237219 A1 Jul. 28, 2022

(51) Int. Cl.
*G06F 16/35* (2019.01)
*G06F 16/387* (2019.01)

(52) U.S. Cl.
CPC ............ *G06F 16/35* (2019.01); *G06F 16/387* (2019.01)

(58) Field of Classification Search
CPC ...... G06F 16/35; G06F 16/387; G06F 16/285; G06F 16/353; G06F 40/30; G06F 16/215;
(Continued)

(56) References Cited

U.S. PATENT DOCUMENTS 6,236,768 B1 * 5/2001 Rhodes ................... G06F 16/38
382/229
10,528,329 B1 * 1/2020 Doyle ....................... G06F 8/31
(Continued)

FOREIGN PATENT DOCUMENTS

JP   2016110165 A  *  6/2016
JP   2018195118 A     12/2018

OTHER PUBLICATIONS

Mio Sato (2011) "About the reliability of information sent from social media" Junior College of Aizu, Department of Industrial Information, Management Information Course, 2011 Graduation Research Papers Abstracts [online] website: http://www.jc.u-aizu.ac.jp/department/management/youshi/2011/09.pdf.
(Continued)

*Primary Examiner* — Evan Aspinwall

(57) ABSTRACT

An information extracting device includes an acquiring unit that acquires, with regard to each information source, a data group made up of data including a content relating to an object, a location where the content was recorded, and a date and time at which the content was recorded, a generating unit that generates a word vector of which the date and time, the location, content using a weight based on the date and time, and a type of the content, are each components, for each of the data of the data group, a distance calculating unit that calculates a distance among the word vectors, a classifying unit that classifies each of data of the data group on the basis of the distance among the word vectors, and an extracting unit that calculates a reliability with regard to the classification, and extracts data from the data group on the basis of the reliability.

20 Claims, 7 Drawing Sheets

(58) Field of Classification Search
CPC ...... G06F 16/22; G06F 16/254; G06F 16/355; G06F 18/22; G06F 16/2237; G06F 18/24; G06F 18/24137; G06F 16/313; G06F 18/2411; G06F 18/24317; G06F 18/2431; G06F 21/316; G06F 21/552; G06F 16/2228; G06F 16/24575; G06F 16/3347; G06F 16/84; G06N 5/046; G06N 5/025; G06N 99/00; G06N 20/00
USPC .......... 707/749, 752, 999.007, 748, E17.09, 707/E17.084, 737; 706/20
See application file for complete search history.

(56) References Cited

U.S. PATENT DOCUMENTS

| | | | | |
|---|---|---|---|---|
| 2006/0212413 | A1* | 9/2006 | Rujan | G06F 16/355 706/20 |
| 2016/0314182 | A1* | 10/2016 | Zhang | H04L 43/04 |
| 2019/0049256 | A1* | 2/2019 | Camp | B60W 40/068 |
| 2020/0380389 | A1* | 12/2020 | Eldeeb | G06F 16/285 |

OTHER PUBLICATIONS

Otsuka et al. (2012) "Evaluation and Development reputation network for SNS user evaluation using realistic distance" The 11th Knowledge Distribution Network Study Group of the Japanese Society for Artificial Intelligence, Sep. 28, 2012.
Ishigaki et al. (2016) "Proposal of user importance evaluation method using Twitter-specific network structure" DEIM Forum 2016.

* cited by examiner

Fig. 4

| DATE AND TIME | WORD STRING | WORD VECTOR | COSINE DISTANCE |
|---|---|---|---|
| 2019/2/21 | 35.225,139.665,STAIRS | 1,1,0,0,1,0 | - |
| 2018/2/21 | 35.225,139.665,STAIRS | 1,1,0,0,0.026,0 | 0.826968 |
| 2019/2/21 | 35.225,139.665,STAIRS | 1,1,0,0,1,0 | 1.000000 |
| 2019/2/21 | 35.225,139.665,FLAT | 1,1,0,0,0,1 | 0.666667 |
| 2019/2/21 | 35.220,139.662,STAIRS | 0,0,1,1,1,0 | 0.577350 |

| ID | WORD STRING | WEIGHT OF INFORMATION SOURCE |
|---|---|---|
| 1 | 2019,2,21,35.225,139.665,STAIRS | 1.0 |
| 2 | 2019,2,21,35.225,139.665,STAIRS | 0.7 |
| 3 | 2019,2,21,35.223,139.664,INCLINE | 1.0 |
| 4 | 2019,2,21,35.225,139.665,FLAT | 0.5 |
| 5 | 2019,2,21,35.223,139.664,INCLINE | 0.5 |
| 6 | 2018,2,21,35.225,139.665,STAIRS | 0.026(=1.0*0.026) |
| 7 | 2019,2,21,35.225,139.665,STAIRS | 0.5 |
| 8 | 2019,2,21,35.225,139.665,FLAT | 0.5 |
| 9 | 2019,2,21,35.225,139.665,STAIRS | 0.7 |
| 10 | 2019,2,21,30.116,132.312,RESTROOM | 1.0 |

| CID | ID |
|---|---|
| 1 | 1,2,4,6,7,8,9 |
| 2 | 3,5 |
| 3 | 10 |

REGARDING CID = 1

| WORD STRING | FREQUENCY OF APPEARANCE | WEIGHT AVERAGE | RELIABILITY |
|---|---|---|---|
| 35.225,139.665, STAIRS | 5 | 0.561 | 0.676 |
| 35.225,139.665, FLAT | 2 | 0.600 | 0.228 |

INFORMATION EXTRACTING DEVICE, INFORMATION EXTRACTING METHOD, AND INFORMATION EXTRACTING PROGRAM

CROSS-REFERENCE TO RELATED APPLICATIONS

This application is a U.S. National Stage Application filed under 35 U.S.C. § 371 claiming priority to International Patent Application No. PCT/JP2019/023768, filed on 14 Jun. 2019, the disclosure of which is hereby incorporated herein by reference in its entirety.

TECHNICAL FIELD

The technology of the disclosure relates to an information extracting device, and information extracting method, and an information extracting program.

BACKGROUND ART

There is technology for collecting data with regard to a certain object. For example, there is technology for extracting road conditions data relating to conditions of a road over which traffic passes.

For example, there is technology for appropriately extracting a geological range regarding which sensor data necessary for road estimation is insufficient (see PTL 1, for example). In this technology, on the basis of estimation results of estimating a moving state, and an accuracy rate of an estimator obtained in advance, road conditions corresponding to the moving state are estimated along with a probability of road conditions, for each geological range. Also, geological ranges of which the probability of the estimated road conditions do not satisfy a threshold value set in advance are extracted as geological ranges regarding which sensor data is insufficient.

Also, there is technology regarding a technique for evaluating data, in which reliability and so forth is calculated from information relating to SNS users, and data is evaluated (see NPL 1 to 3, for example)

CITATION LIST

Non Patent Literature

[NPL 1] Mio Sato, "*Sousharu Media Kara Hasshinn Sareta Jouhou no Shinraido ni Tsuite* (Reliability of Information Originating from Social Media)", [online], Junior College of Aizu, Department of Industrial Information, management information course, graduation research thesis abstracts, academic year 2011, [retrieved on Aug. 13, 2018], Internet <URL:http://www.jc.u-aizu.ac.jp/department/management/youshi/2011/09.pdf>

[NPL2] Takanobu Ohtsuka and two others, "Evaluation and Development reputation network for SNS user evaluation using realistic distance", the Japanese Society for Artificial Intelligence, 11th Knowledge Sharing Network Conference, Internet (URL: http://sigksn.html.xdomain.jp/conf11/SIG-KSN-011-06.pdf>

[NPL 3] Aimu Ishigaki, Masayuki Numao, "*Twitter Tokuyuu noNettowaku Kouzou wo Mochiita Yuza Jyuyoudo Hyouka Hou no Teian* (Proposal for User Importance Evaluation Method Using Network Structure Unique to Twitter)", DEIM Forum 2016 B7-4, Internet (URL: http://db-event.jpn.org/deim2016/papers/302.pdf>

PATENT LITERATURE

[PTL 1] Japanese Patent Application Publication No. 2018-195118

SUMMARY OF THE INVENTION

Technical Problem

However, in the technique described in the above PTL 1, there are cases where data necessary for extraction at a certain place cannot be sufficiently secured. Accordingly, there are cases where data cannot be extracted in the first place, or even if data is extracted, the precision of extraction results is low, or even if data is extracted, judgement cannot be made whether the extraction results are correct or not, and so forth.

Also, conventionally, in a technique of extracting data of which reliability is no less than a threshold value, there are cases where a plurality of pieces of data exceeds the threshold value. In cases where a plurality of pieces of data exceeds the threshold value, which data of which contents to employ as extraction results has been manually judged.

With the foregoing points in view, it is an object of the technology of the disclosure to provide an information extracting device, and an information extracting method, and an information extracting program that can efficiently extract appropriate information.

Means for Solving the Problem

A first aspect of the present disclosure is an information extracting device, including an acquiring unit that acquires, with regard to each information source, a data group made up of data including a content relating to an object, a location where the content was recorded, and a date and time at which the content was recorded, a generating unit that generates a word vector of which the date and time, the location, content using a weight based on the date and time, and a type of the content, are each components, for each of the data of the data group, a distance calculating unit that calculates a distance among the word vectors, a classifying unit that classifies each of data of the data group on the basis of the distance among the word vectors, and an extracting unit that calculates a reliability with regard to the classification, and extracts data from the data group on the basis of the reliability.

A second aspect of the present disclosure is an information extracting method of a computer executing processing including acquiring, with regard to each information source, a data group made up of data including a content relating to an object, a location where the content was recorded, and a date and time at which the content was recorded, generating a word vector of which the date and time, the location, content using a weight based on the date and time, and a type of the content, are each components, for each of the data of the data group, calculating a distance among the word vectors, classifying each of data of the data group on the basis of the distance among the word vectors, and calculating a reliability with regard to the classification, and extracting data from the data group on the basis of the reliability.

A third aspect of the present disclosure is an information extracting program that causes a computer to execute acquiring, with regard to each information source, a data group made up of data including a content relating to an object, a location where the content was recorded, and a date and time at which the content was recorded, generating a word vector of which the date and time, the location, content using a weight based on the date and time, and a type of the content, are each components, for each of the data of the data group, calculating a distance among the word vectors, classifying each of data of the data group on the basis of the distance among the word vectors, and calculating a reliability with regard to the classification, and extracting data from the data group on the basis of the reliability.

Effects of the Invention

According to technology of the disclosure, appropriate information can be efficiently extracted.

BRIEF DESCRIPTION OF DRAWINGS

FIG. 4 is a diagram illustrating an example of a case where relations of distances among word vectors are expressed in a table.

DESCRIPTION OF EMBODIMENTS

An example of an embodiment of the technology of the disclosure will be described below with reference to the drawings. Note that components and parts that are the same or that are equivalent are denoted by the same reference symbols in the figures. Also, the dimensional proportions in the figures may be exaggerated for the sake of convenience in description, and may be different from actual proportions.

Figure 1:
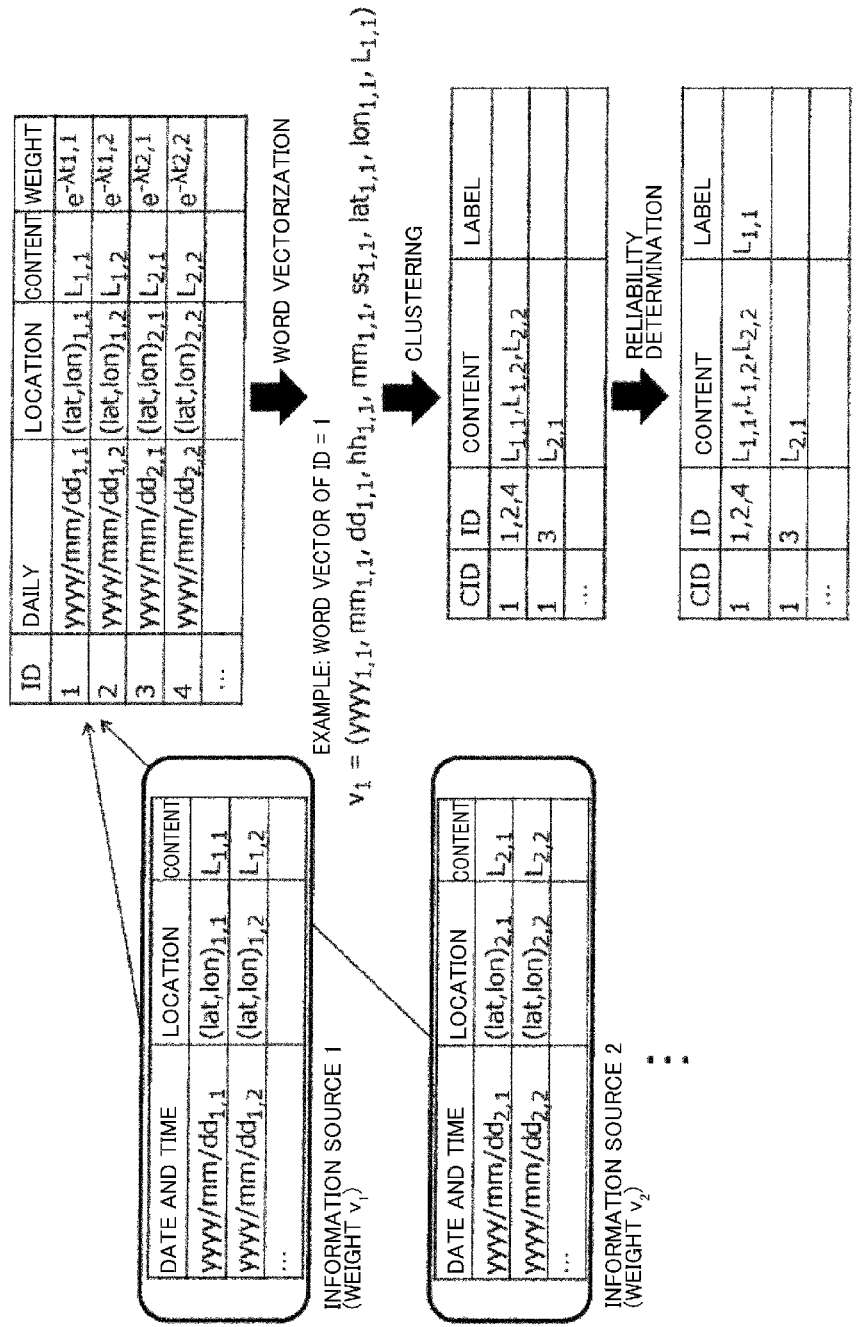
FIG. 1 is a conceptual diagram illustrating an overall flow of processing of the technology according to the present disclosure.

The technology according to the present disclosure proposes a technique for extracting probable data regarding an object regarding which data is to be extracted, by taking into consideration a plurality of objects, such as date and time, location, content, and so forth. FIG. 1 is a conceptual diagram illustrating an overall flow of processing of the technology according to the present disclosure. As illustrated in FIG. 1, in the present technique, data including date and time, location, and content of the information source is acquired, word vectorization is performed, and word vectors are generated. Also, in the present technique, word vectors are clustered, reliability of clusters is determined, and labels indicating content of data are extracted. The content is words represented by $L_{i,j}$, and in the present embodiment $L_{i,j}$ is types of road conditions. $L_{i,j}$ is represented as a word list of $N_{i,j}$ words, where $L_{i,j}=(w1, w2, \ldots, w_{N_{i,j}})$. The date and time show as far as the date regarding items for date and time in FIG. 1, but time may be used. This is true for the figures described below.

Although a case of acquiring and extracting data containing contents of road conditions from user terminals will be described below as an example in which the object is road conditions and each user terminal is an information source, but other objects may be used. For example, this can be applied to cases of extracting data of shop information relating to shops, where shops are the object, and cases of extracting facility information relating to facilities, where facilities are the object, and so forth.

The configuration of the present embodiment will be described below.

Figure 2:
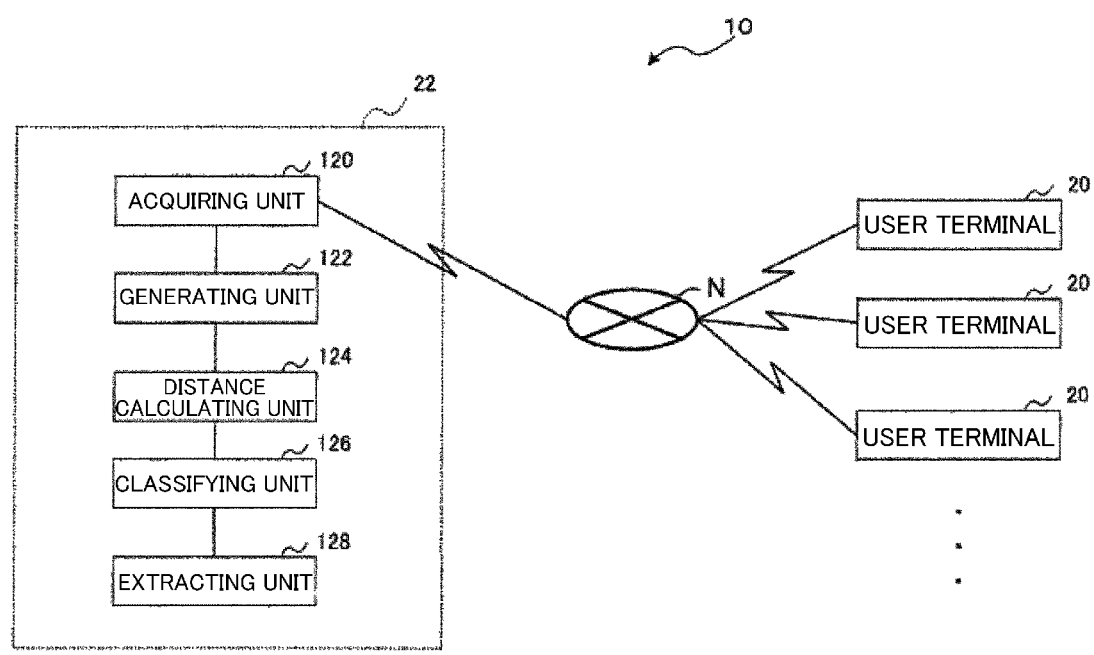
FIG. 2 is a block diagram illustrating an example of a configuration of an information extracting system according to the present embodiment.

FIG. 2 is a block diagram illustrating an example of the configuration of an information extracting system 10 according to the present embodiment. As illustrated in FIG. 2, the information extracting system 10 according to the present embodiment includes a plurality of user terminals 20, and an information extracting device 22. The plurality of user terminals 20 and the information extracting device 22 are connected by a predetermined network N (e.g., Internet line, etc.)

The information extracting device 22 is configured including an acquiring unit 120, a generating unit 122, a distance calculating unit 124, a classifying unit 126, and an extracting unit 128, as illustrated in FIG. 2.

Figure 3:
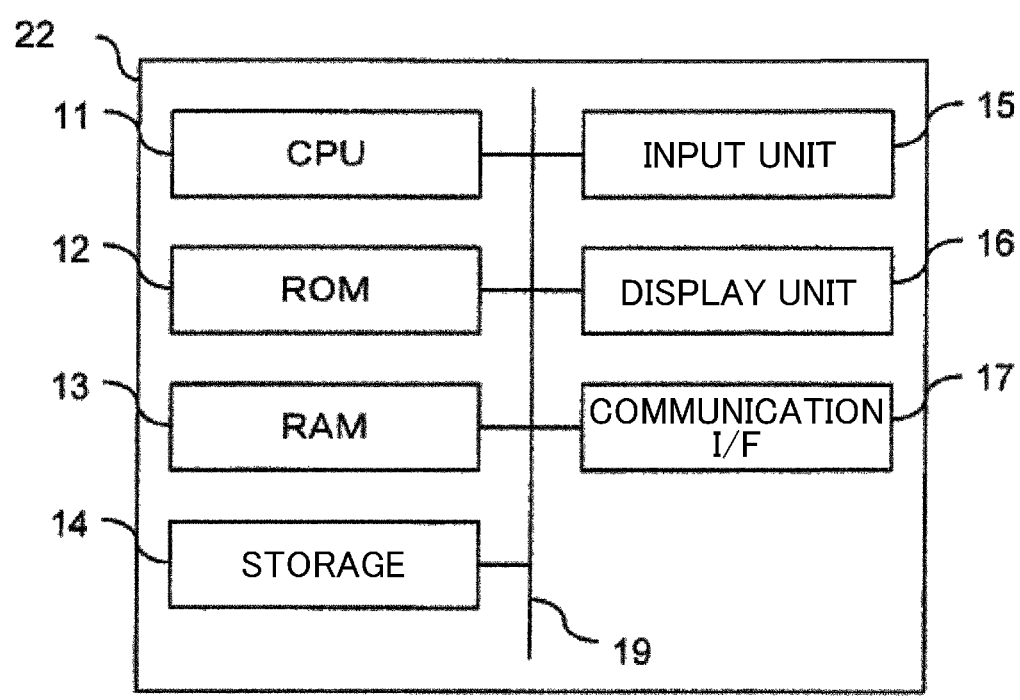
FIG. 3 is a block diagram illustrating a hardware configuration of the information extracting device.

FIG. 3 is a block diagram illustrating the hardware configuration of the information extracting device 22.

The information extracting device 22 has a CPU (Central Processing Unit) 11, ROM (Read Only Memory) 12, RAM (Random Access Memory) 13, storage 14, an input unit 15, a display unit 16, and a communication interface (I/F) 17, as illustrated in FIG. 3. The configurations are communicably connected to each other via a bus 19.

The CPU 11 is a central processing unit, and executes various types of programs, controls the parts, and so forth. That is to say, the CPU 11 reads programs out from the ROM 12 or the storage 14, and executes the programs using the RAM 13 as a work region. The CPU 11 performs control of the above configurations, and various types of computation processing, following programs stored in the ROM 12 or in the storage 14. In the present embodiment, an information extracting program is stored in the ROM 12 or in the storage 14.

The ROM 12 stores various types of programs and various types of data. The RAM 13 temporarily stores programs or data as a work area. The storage 14 is configured of an HDD (Hard Disk Drive) or an SSD (Solid State Drive), and stores various types of programs including an operating system and various types of data.

The input unit 15 includes pointing devices such as a mouse or the like, and a keyboard, and is used to perform various types of input.

The display unit 16 is a liquid crystal display, for example, and displays various types of information.

The display unit 16 may employ a touchscreen form, and function as the input unit 15 as well.

The communication interface 17 is an interface for communication with other devices, such as terminals and the like, and uses standards such as, for example, Ethernet (registered trademark), FDDI, Wi-Fi (registered trademark), and so forth.

Note that the user terminal 20 may be configured of a hardware configuration the same as that of the information extracting device 22.

Next, the functional configurations of the user terminals 20 and the information extracting device 22 of the information extracting system 10 will be described. The functional configurations of the information extracting device 22 are realized by the CPU 11 reading out, and loading to the RAM 13, an information extracting program stored in the ROM 12 or in the storage 14, and executing the program.

The user terminal 20 is a terminal that any user holds. The user terminal 20 measures the road conditions, as contents relating to an object, by a sensor provided to the terminal itself. Types of road conditions are, for example, flat, stepped, and so forth. The user terminal 20 transmits a data group made up of data including the contents of the road conditions measured, the location where the road conditions were recorded, and the date and time when the road conditions were recorded, to the information extracting device 22. The timing of transmitting the data group may be at predetermined intervals set by the information extracting system 10 regarding the user terminal 20. The location is acquired from positioning information that is lat representing latitude and lon representing longitude. The date and time is the date and the clock time, and is acquired in a format of "YYYY/MM/DD/hh", for example.

Next, the parts of the information extracting device 22 will be described.

With each of the user terminals 20 as an information source, the acquiring unit 120 acquires data groups from each information source.

The generating unit 122 generates word vectors of which date and time, location, content using weighting based on date and time, and type of content, are each components, for each of the data of the data group. With regard to the component relating to content using weighting based on the date and time, the product of the frequency of appearance of the content (0 is non-occurring and 1 is occurring) and weighting based on the date and time is used. For the weighting based on the date and time, a weight $e^{-\lambda t}$ ($t=t_{i,j}$) based on a difference $t_{i,j}$ between the current date and time T at the time of processing at the generating unit 122 and the date and time $T_{i,j}$ of the data ($t_{i,j}=T-T_{i,j}$) is used. Also, the weighting of the information source used in calculation of a later-described reliability is the product of the weight $e^{-\lambda t}$ and a weight $w_{i,j}$ set regarding the data of the information source. A weight manually set at each information source is used for the weight $w_{i,j}$. For example, an information source that is presumed to have high reliability as an information source is set to a high value $w_{i,j}$, and an information source that has low reliability has a low value set to a weight $w_{i,j}$. The location has, as a component thereof, values of latitude and longitude, of which values smaller than a CT'th place after the decimal point are deleted, in accordance with a threshold value CT.

The distance calculating unit 124 calculates distances among word vectors, using the word vectors generated regarding each of the data at the generating unit 122. The distance calculating unit 124 calculates the distance among the word vectors by cosine distance, and obtains the closeness among the word vectors. Distance among the word vectors may be obtained by selecting a word vector from each of the data as a reference word vector, and calculating the cosine distance for each of combinations between the reference word vector and the word vectors other than the reference word vector.

FIG. 4 is a diagram illustrating an example of a case where the relation in distances among word vectors is represented as a table. In the example in FIG. 4, the first row is used as the reference word vector, and the cosine distance to each of the second word vector and subsequent word vectors is obtained. The word vectors have date and time, location, product of weight $e^{-\lambda t}$ and content, and road conditions, as elements thereof. The closer the cosine distance is to 1, the closer to each other the word vectors can be said to be. The data in the second row is data from 2018, with a great difference between the current date and time T and the date and time $T_{i,j}$ in the data, and accordingly the weight $e^{-\lambda t}$ is set low here. Accordingly, in a case where, for example, T=Feb. 21, 2019, and λ=0.01, the value of the component relating to content is 0.026, which is a low value.

The classifying unit 126 classifies each piece of data of the data group on the basis of the distance among the word vectors. The classifying unit 126 classifies each piece of data into one of clusters, using a hierarchical clustering technique.

The clustering technique will be described. Hierarchical clustering and non-hierarchical clustering are known as clustering techniques. In hierarchical clustering, a dendrogram (tree diagram) is generated, and there is no need to decide the number of clusters in advance. Examples of hierarchical clustering include Ward's method, group average method, and so forth. Conversely, non-hierarchical clustering requires deciding the number of clusters in advance. Known examples of non-hierarchical clustering include k-means, fuzzy c-means, and so forth. Note that before performing clustering, commonly, the number of clusters is often unknown.

Accordingly, clustering is performed using hierarchical clustering in the present embodiment. In hierarchical clustering, at least one cluster contains a plurality of clusters. Also, in hierarchical clustering, clustering is performed on the basis of similarity in distance among word vectors.

Figure 5:
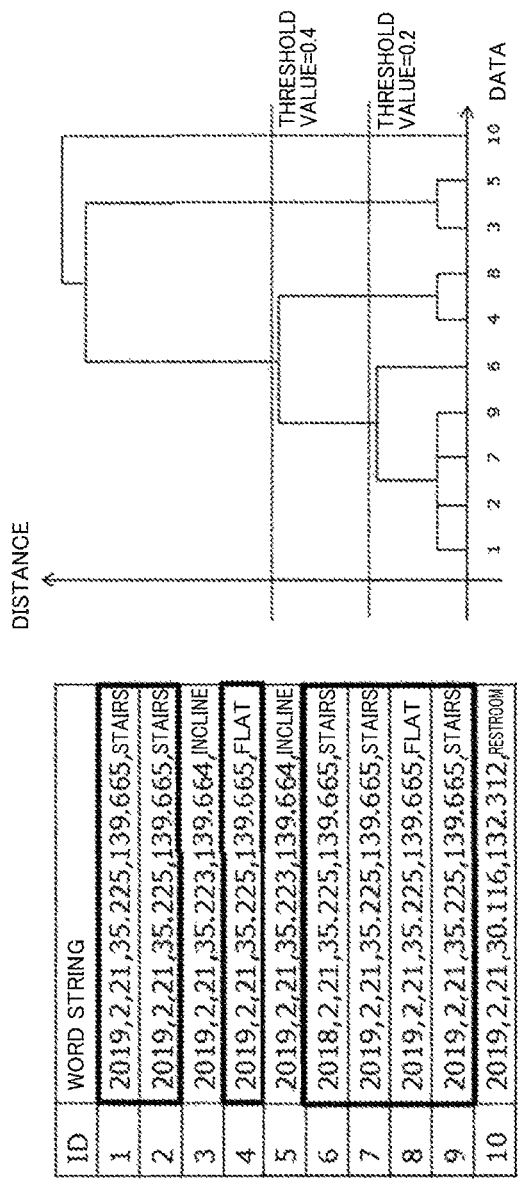
FIG. 5 is an example of a case where data is classified into clusters by threshold values regarding distance, by hierarchical clustering.

FIG. 5 shows an example of a case in which data is classified into clusters by threshold values as to cosine distance, using hierarchical clustering. The left side in FIG. 5 is word strings corresponding to word vectors, and the right side in FIG. 5 shows a tree diagram showing the similarity by distance among word vectors, for each ID of data. The vertical axis (distance) in FIG. 5 shows distance=1−(cosine distance), and the more similar two word vectors are to each other, the closer the value is to 0. In the tree diagram in FIG. 5, threshold value 0.2 and threshold value 0.4 are set as threshold values to determining the similarity in distance. Here, the threshold value 0.4 will be handled as a similar cluster. As shown in the tree diagram in FIG. 5, the distances among the word vectors of the IDs 1, 2, 7, and 9 are close, and are similar. Also, the ID 6 is also smaller than the threshold value 0.2 and is similar to the IDs 1, 2, 7, and 9. When viewed from the threshold value 0.4, the IDs 4 and 8 are also similar. Accordingly, the word vectors of the IDs 1, 2, 4, 6, 7, 8, and 9, surrounded by heavy lines to the left in FIG. 5, are distinguished as being the same cluster, and are classified.

As described above, the classifying unit 126 distinguishes each piece of data as being data to be in the same cluster according to threshold values in distance among the word vectors, and classifies this data into this cluster, by the hierarchical clustering technique.

The extracting unit 128 calculates reliability regarding the classification, and extracts data from the data groups on the basis of reliability. Specifically, the extracting unit 128 calculates reliability of each of sub-classifications that are classifications for each type of content (road condition) of data included in a classification, for each classification of a cluster. The reliability of a sub-classification is calculated on the basis of the frequency of appearance of the content in this sub-classification, and the average of the weight $w_{i,j}$ set for the data of the information source in this sub-classification. The extracting unit 128 extracts a label indicating the content of the road conditions corresponding to reliability of the threshold value or higher, and extracts and outputs the data of the data group including the content of the label, along with the label. Sub-classifications here indicate the type of content included in the classifications in the cluster, and are "stairs" and "flat", for example.

A reliability calculating technique will be described. In the present embodiment, reliability is calculated using probability statistics. For example, a premise is made that phenomenon A is "a: there is a barrier θ", and phenomenon B is "b: there is no barrier θ". The probability that phenomenon A is occurring at a given spot is probability PA, and the probability that phenomenon B is occurring at a given spot is probability PB. Also, there are contents a and b at the points where the phenomena A and B occur, and the probabilities of a and b appearing in the data are $p_A(a)$, $p_A(b)$, $p_B(a)$, and $p_B(b)$, respectively. Note that information regarding the phenomena A and B is set from information such as open data or the like. Also, a user count n is obtained by measurement. Further, $p_A(a)$, $p_A(b)$, $p_B(a)$, and $p_B(b)$ are set in advance in accordance with precision of information extraction through trials or the like.

Under the above conditions, when an r count of users out of an n count of people at a certain spot recognize a certain cluster $C_i$ to be the phenomenon A, the probability $Q(C_i)$ of that spot actually being A will be considered. In this case, the probability $Q(C_i)$ can be calculated by the following Expression (1) using Bayes' theorem.

[Math. 1]

$$Q(C_i) = \frac{P_A \binom{n}{r} p_A(a)^r p_A(b)^{n-r}}{\sum_{i \in \{A,B\}} P_i \binom{n}{r} p_i(a)^r p_i(b)^{n-r}} \quad (1)$$

This is provided that $P_A+P_B=1$, $p_A(a)+p_A(b)=1$, and $p_B(a)+p_B(b)=1$ hold. The probability $Q(C_i)$ is obtained with the above Expression (1), and taken as the reliability of the sub-classification.

Figure 6:
FIG. 6 is an example of a case where word strings of each sub-classification of clusters, appearance frequency, weighting average, and reliability, are expressed in a table.

Next, an example of calculation of reliability will be described. FIG. 6 is an example of compiling a table of word strings, frequencies of appearance, weight averages of information sources, and reliability, for each sub-classification regarding clusters. In the example shown in FIG. 6, there are CIDs 1 through 3, which are cluster IDs of clusters. Of these, "stairs" and "flat" are used as sub-classifications to compile a table for CID: 1. The frequency of appearance, weight average of information sources, and reliability are calculated for this cluster, regarding each of the sub-classifications "stairs" and "average" for the cluster of CID: 1. The frequency of appearance is the frequency of appearance of the sub-classification out of all data in the cluster. The weight average is the weight average of information sources of the sub-classification out of all data in the cluster. The reliability is the reliability of the sub-classification out of all data in the cluster. A probability value for calculating the reliability of the sub-classification in Expression (1) will be described here. A premise will be made that the weight average of the sub-classification "stairs" is 0.561, and that the weight average of the sub-classification "flat" is 0.600. In this case, the reliability of the sub-classification "stairs" is calculated by the above Expression (1), with $p_A(a)=p_B(b)=0.561$, $p_A(b)=p_B(a)=0.439$. That is to say, the weight average is the value of $p_A(a)$. Calculation is performed with n that is the total count of data as 7 and r that is the frequency of appearance as 5. Also, the reliability of the sub-classification "flat" is calculated by the above Expression (1), with $p_A(a)=p_B(b)=0.6$, $p_A(b)=p_B(a)=0.4$. Calculation is performed with n that is the total count of data as 7 and r that is the frequency of appearance as 2. Under the above conditions, the reliability of the sub-classification "stairs" is calculated as being 0.676, and the reliability of the sub-classification "flat" as being 0.228.

Next, the operations of the information extracting device 22 of the information extracting system 10 will be described.

Figure 7:
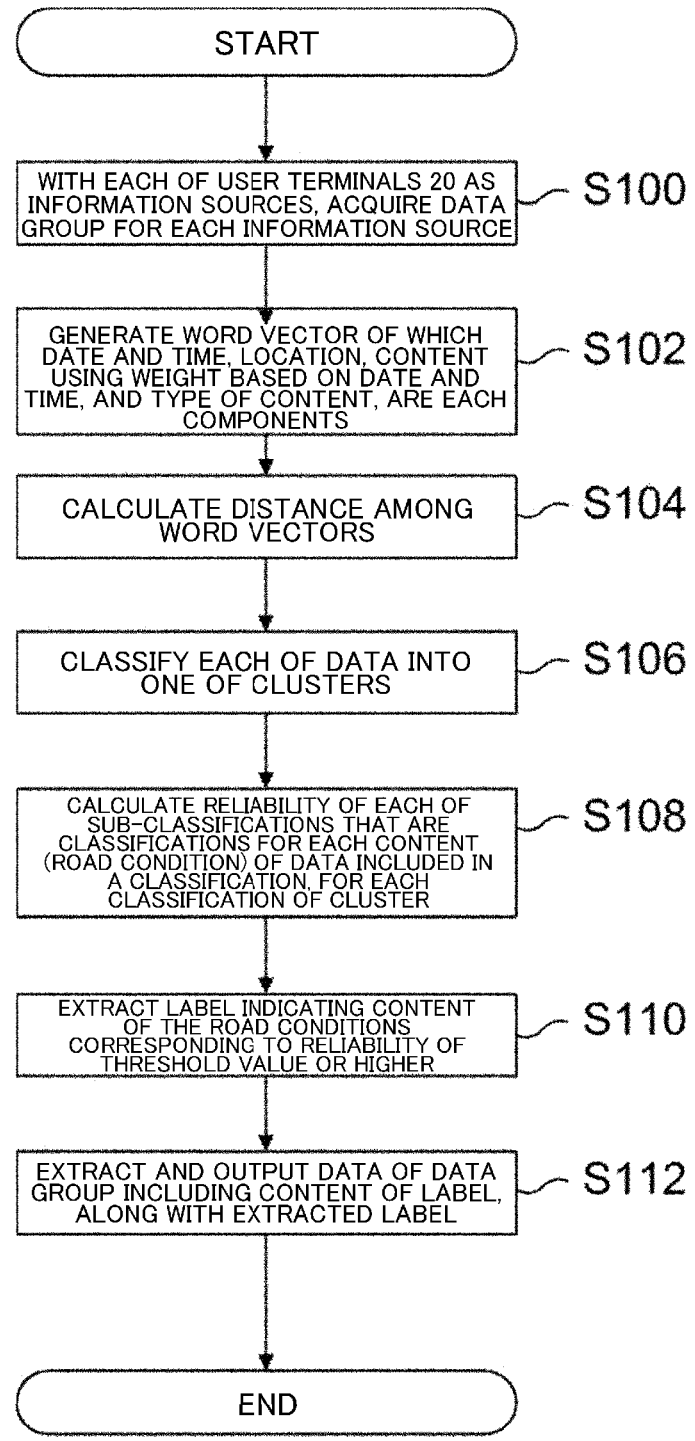
FIG. 7 is a flowchart showing the flow of information extracting processing by the information extracting device.

FIG. 7 is a flowchart showing the flow of information extracting processing by the information extracting device 22. The information extracting processing is carried out by the CPU 11 reading out, and loading to the RAM 13, an information extracting program from the ROM 12 or the storage 14, and executing the program. The user terminals 20 transmit data groups made up of contents of road conditions that are measured, the locations where the road conditions were recorded, and data including the date and time at which the road conditions were recorded, to the information extracting device 22 at predetermined intervals.

In step S100, the CPU 11 obtains data groups from each of the information sources, with each of the user terminals 20 as information sources.

In step S102, the CPU 11 generates word vectors in which each of the date and time, location, content using weighting based on the date and time, and the type of content, are components, for each piece of data in the data groups. With regard to the component relating to content using weighting based on the date and time, the product of the frequency of appearance of the content (0 is non-occurring and 1 is occurring) and weighting based on the date and time is used. For the weighting based on the date and time, the weight $e^{-\lambda t}$ ($t=t_{i,j}$) based on the difference $t_{i,j}$ between the current date and time T at the time of processing and the date and time $T_{i,j}$ of the data ($t_{i,j}=T-T_{i,j}$) is used.

In step S104, the CPU 11 uses the word vectors generated for each of the data, and calculates distances among the word vectors.

In step S106, the CPU 11 uses a hierarchical clustering technique based on the distances among the word vectors to classify each of the data of the data groups into one of the clusters.

In step S108, the CPU 11 calculates the reliability of each of sub-classifications that are classifications for each type of content (road condition) of data included in a classification, for each classification in the cluster. The reliability of the sub-classification is calculated on the basis of the frequency of appearance of the content in this sub-classification, and the average of the weight $w_{i,j}$ set for the data of the information source in this sub-classification, in accordance with the above Expression (1).

In step S110, the CPU 11 extracts a label indicating the content of the road conditions corresponding to reliability of the threshold value or higher.

In step S112, the CPU 11 extracts and outputs the data of the data group including the content of the label, along with the extracted label.

As described above, according to the information extracting device 22 of the present embodiment, appropriate information can be efficiently extracted.

Also, while handling text strings and numerical values at the same time was difficult with conventional techniques, clustering that collectively takes into consideration date and time, location, and content, can be performed by the present technique. Also, this is because reliability based on the weight set regarding the information sources and the frequency of appearance is used, and probable information can be extracted from a plurality of information sources.

Also, although a case is described in the above embodiment regarding calculating reliability for each sub-classification and extracting data, this is not limiting. For example, an arrangement may be made where the reliabilities of sub-classifications are integrated with regard to classification of clusters, and extract a breakdown of contents and reliability of sub-classifications for data included in classifications of clusters no lower than a threshold value.

Note that various types of processors other than a CPU may execute the information extracting processing that the CPU performs by reading in software (programs) and executing in the above embodiments. Examples of processors in this case include dedicated electric circuits and so forth that are processors having a circuit configuration designed for dedicated execution of particular processing, such as PLDs (Programmable Logic Device) of which the circuit configuration can be changed after manufacturing, like FPGAs (Field-Programmable Gate Array) and so forth, and ASICs (Application Specific Integrated Circuit) and so forth. This information extracting processing may also be executed by one of these various types of processors, or may be executed by a combination of two or more processors of the same type or different types (e.g., a plurality of FPGAs, a combination of a CPU and an FPGA, and so forth). More specifically, the hardware configuration of these various types of processors are electric circuits where circuit elements such as semiconductor elements and so forth are combined.

Also, while description is made in the above embodiments regarding an arrangement in which an information extracting program is stored (installed) in the storage 14 in advance, this is not limiting. The program may be provided in a form stored in a non-transitory storage medium, such as a CD-ROM (Compact Disk Read Only Memory), DVD-ROM (Digital Versatile Disk Read Only Memory), USB (Universal Serial Bus) memory, and so forth. A form may also be made in which the program is downloaded from an external device via a network.

In relation to the above embodiment, the following appendices are further disclosed.

APPENDIX 1

An information extracting device, including: a memory, and at least one processor connected to the memory, wherein the processor is configured to acquire, with regard to each information source, a data group made up of data including a content relating to an object, a location where the content was recorded, and a date and time at which the content was recorded, generate a word vector of which the date and time, the location, content using a weight based on the date and time, and a type of the content, are each components, for each of the data of the data group, calculate a distance among the word vectors, classify each of data of the data group on the basis of the distance among the word vectors, and calculate a reliability with regard to the classification, and extract data from the data group on the basis of the reliability.

APPENDIX 2

A non-transitory storage medium storing an information extracting program that causes a computer to execute acquiring, with regard to each information source, a data group made up of data including a content relating to an object, a location where the content was recorded, and a date and time at which the content was recorded, generating a word vector of which the date and time, the location, content using a weight based on the date and time, and a type of the content, are each components, for each of the data of the data group, calculating a distance among the word vectors, classifying each of data of the data group on the basis of the distance among the word vectors, and calculating a reliability with regard to the classification, and extracting data from the data group on the basis of the reliability.

REFERENCE SIGNS LIST

10 Information extracting system
20 User terminal
22 Information extracting device
120 Acquiring unit
122 Generating unit
124 Distance calculating unit
126 Classifying unit
128 Extracting unit

The invention claimed is:

1. An information extracting device comprising circuitry configured to execute operations comprising:
    acquiring, using a device as an information source, a data group, wherein the device comprises a sensor capturing data of an object, and the data group comprises:
        the data including a content describing the object,
        a location where the content was recorded, and
        a date and time at which the content was recorded;
    generating a word vector of each of the data of the data group,
        wherein the word vector is based at least on a textual expression of:
            the date and time,
            the location,
            the content according to a first weight, and
            a type of the content, and
        the first weight is based on a difference between the date and time and a current date and time;
    determining a distance among a plurality of word vectors of a plurality of data in the data group;
    classifying each data of the data group on the basis of the distance among the plurality of word vectors to generate one or more clusters of the data according to classification;
    determining, based at least on a frequency of appearance of the classified each data of the data in the classification and a second weight associated with each information source, reliability data of the classification;
    extracting data from the data group on the basis of the reliability data:, and
    transmitting the extracted data to an application configured to output the extracted data including extracted content describing the object with improved reliability according to the reliability data of the extracted data.

2. The information extracting device according to claim 1, wherein the word vector is based on a product of a frequency of appearance of the content and the first weight.

3. The information extracting device according to claim 1, the circuitry further configured to execute operations comprising:
    calculating reliability data of each of sub-classifications that are classifications by type of content of the data included in the classification, for each classification; and extracting data from the data group on the basis of each reliability of the sub-classifications.

4. The information extracting device according to claim 3, the circuitry further configured to execute operations comprising:
calculating the reliability data of each of the sub-classifications on the basis of:
the frequency of appearance of the content in the sub-classification, and
the average of second weights of a plurality of information sources in the sub-classification for each of the classifications;
extracting a label indicating the content, wherein the reliability data the content is equal to or higher than a predetermined threshold value; or higher; and
extracting and outputting data of the data group including the content of the label, along with the label.

5. A computer-implemented method for extracting information, the method comprising:
acquiring, using a device as an information source, a data group, wherein the device comprises a sensor capturing data of an object, and the data group comprises:
the data including a content describing the object, a location where the content was recorded, and a date and time at which the content was recorded;
generating a word vector of the data of the data group, wherein the word vector is based at least on a textual expression of:
the date and time,
the location,
the content according to a first weight, and
a type of the content, and
the first weight is based on a difference between the date and time and a current date and time of performing the generating a word vector operation;
determining a distance among a plurality of word vectors of a plurality of data in the data group;
classifying each data of the data group on the basis of the distance among the plurality of word vectors to generate one or more clusters of the data according to classification;
determining, based at least on a frequency of appearance of the classified each data of the data in the classification and a second weight of each information source, reliability data of the classification;
extracting data from the data group on the basis of the reliability data; and
transmitting the extracted data to an application configured to output the extracted data including extracted content describing the object with improved reliability according to the reliability data of the extracted data.

6. A computer-readable non-transitory recording medium storing computer-executable program instructions that when executed by a processor cause a computer system to execute a operations comprising:
acquiring, using a device as information source, a data group, wherein the device comprises a sensor capturing data of an object, and the data group comprises:
the data including a content describing the object, a location where the content was recorded, and a date and time at which the content was recorded;
generating a word vector of the data of the data group, wherein the word vector is based at least on a textual expression of:
the date and time,
the location,
the content according to a first weight, and
a type of the content, and
the first weight is based on a difference between the date and time and a current date and time of performing the generating a word vector operation;
determining a distance among a plurality of word vectors of a plurality of data in the data group;
classifying each data of the data group on the basis of the distance among the plurality of word vectors to generate one or more clusters of the data according to classification;
determining, based at least on a frequency of appearance of the classified each data of the data in the classification and a second weight of each information source, reliability data of the classification;
extracting data from the data group on the basis of the reliability data; and
transmitting the extracted data to an application configured to output the extracted data including extracted content describing the object with improved reliability according to the reliability data of the extracted data.

7. The information extracting device according to claim 1, wherein the content of the data of the object indicates a condition of a road, and the condition including one of flat or stepped.

8. The information extracting device according to claim 1, wherein the classifying is based on a hierarchical clustering without a predetermined number of clusters.

9. The information extracting device according to claim 1, the circuitry further configured to execute operations comprising:
outputting, based on the reliability data, the extracted data of the data group including the content of the label.

10. The computer-implemented method according to claim 5, wherein the word vector is based on a product of a frequency of appearance of the content and the weight based on the date and time.

11. The computer-implemented method according to claim 5, the method further comprising:
calculating the reliability data of each of sub-classifications that are classifications by type of content of the data included in the classification, for each classification; and
extracting data from the data group on the basis of each reliability of the sub-classifications.

12. The computer-implemented method according to claim 5, wherein the content of the data of the object indicates a condition of a road, and the condition including one of flat or stepped.

13. The computer-implemented method according to claim 5, wherein the classifying is based on a hierarchical clustering without a predetermined number of clusters.

14. The computer-implemented method according to claim 5, the method comprising:
outputting, based on the reliability data, the extracted data of the data group including the content of the label.

15. The computer-readable non-transitory recording medium according to claim 6, wherein the word vector is based on a product of a frequency of appearance of the content and the weight based on the date and time.

16. The computer-readable non-transitory recording medium according to claim 6, the computer-executable instructions when executed further causing the computer system to execute operations comprising:
calculating the reliability data of each of sub-classifications that are classifications by type of content of the data included in the classification, for each classification; and extracting data from the data group on the basis of each reliability of the sub-classifications.

17. The computer-readable non-transitory recording medium according to claim 6,
wherein the content of the data of the object indicates a condition of a road, and the condition including one of flat or stepped.

18. The computer-implemented method according to claim 11, the method further comprising:
calculating the reliability data of each of the sub-classifications on the basis of:
the frequency of appearance of the content in the sub-classification, and
the average of second weights of a plurality of information sources in the sub-classification for each of the classifications;
extracting a label indicating the content, wherein the reliability data the content is equal to or higher than a predetermined threshold value; and
extracting and outputting data of the data group including the content of the label, along with the label.

19. The computer-readable non-transitory recording medium according to claim 15, the computer-executable instructions when executed further causing the computer system to execute operations comprising:
calculating the reliability of each of sub-classifications that are classifications by type of content of the data included in the classification, for each classification; and
extracting data from the data group on the basis of each reliability of the sub-classifications.

20. The computer-readable non-transitory recording medium according to claim 19, the computer-executable instructions when executed further causing the computer system to execute operations comprising:
calculating the reliability data of each of the sub-classifications on the basis of:
the frequency of appearance of the content in the sub-classification, and
the average of second weights of a plurality of information sources in the sub-classification for each of the classifications;
extracting a label indicating the content, wherein the reliability data is equal to or higher than a predetermined threshold value; and
extracting and outputting data of the data group including the content of the label, along with the label.

* * * * *